June 16, 1953  R. W. BAIRD  2,641,890
COTTON STRIPPER

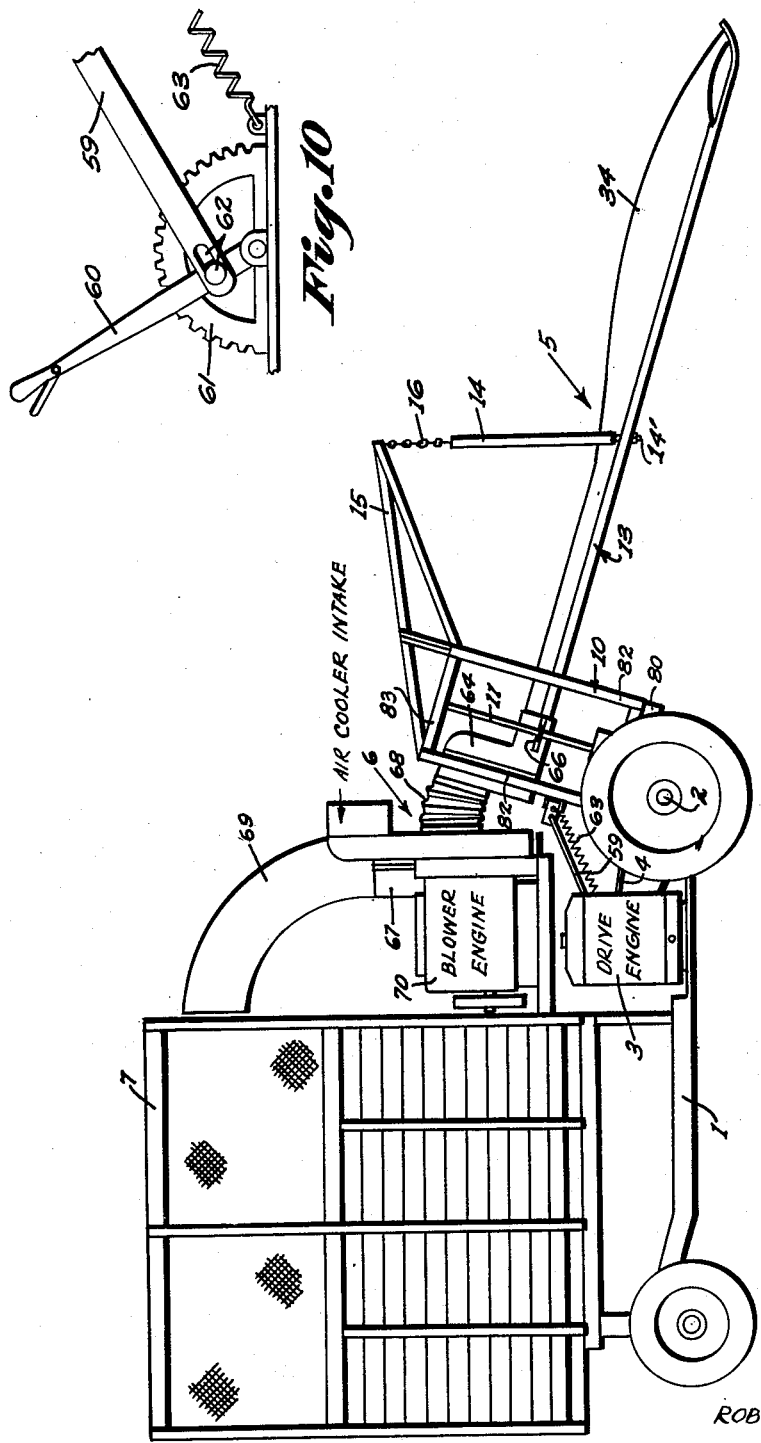

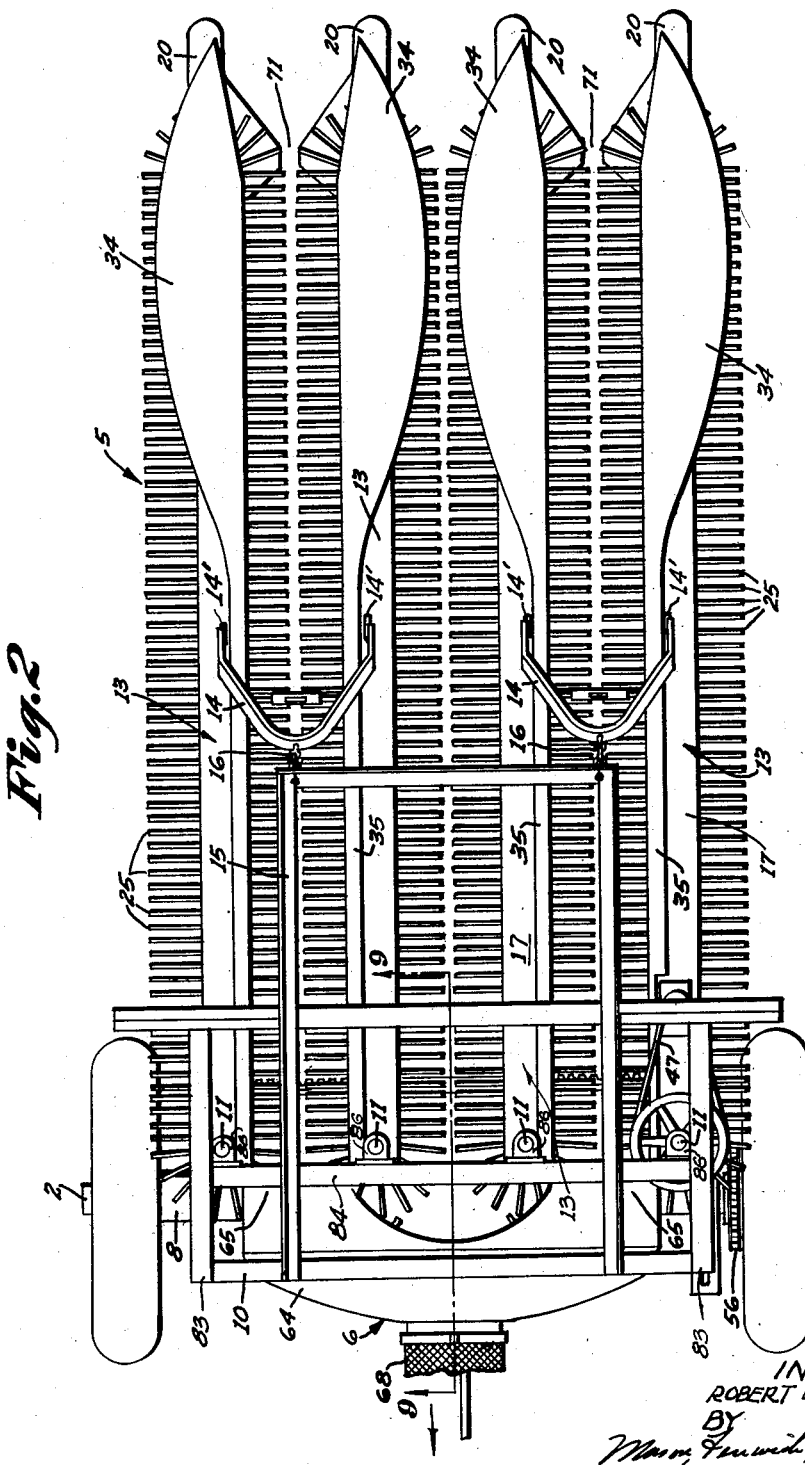

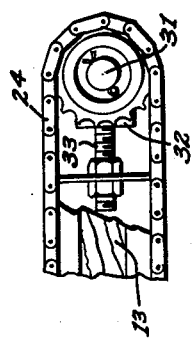
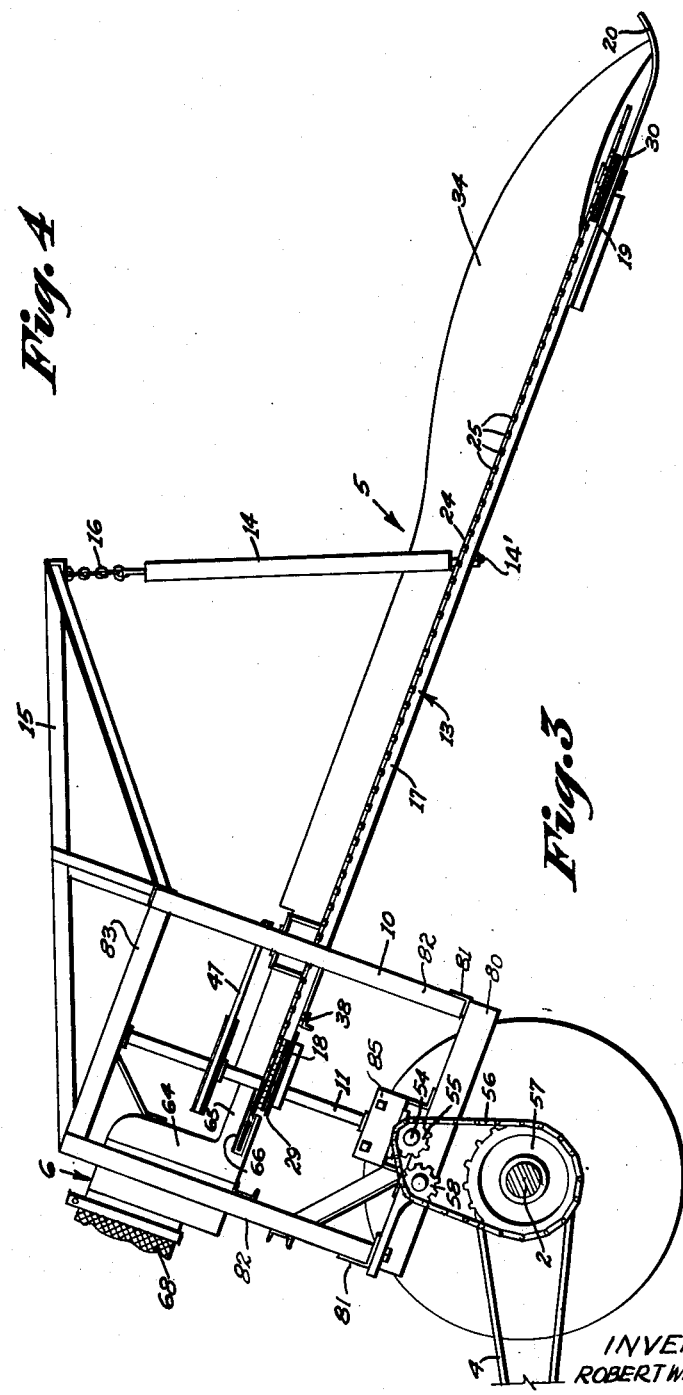

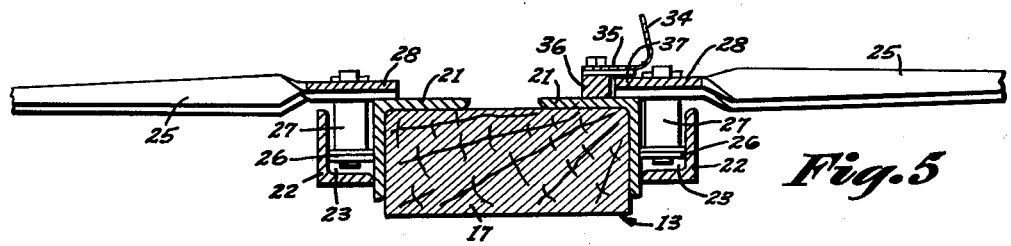
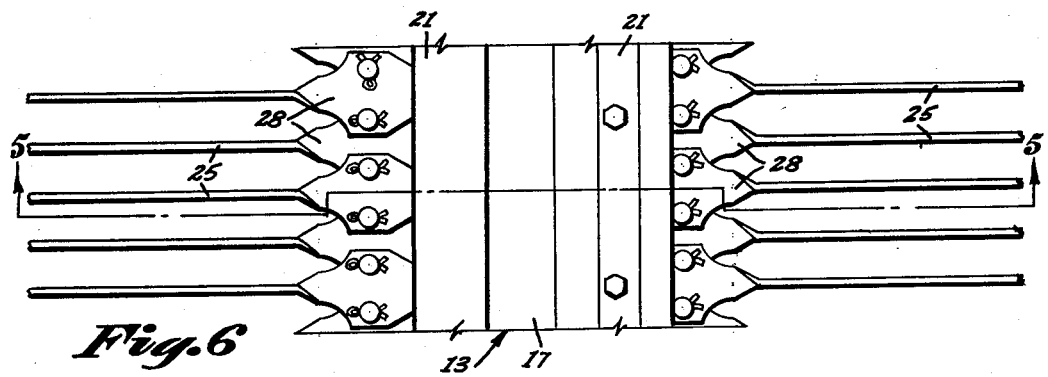
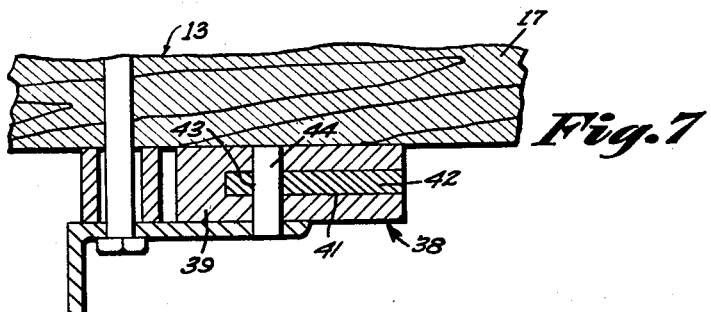
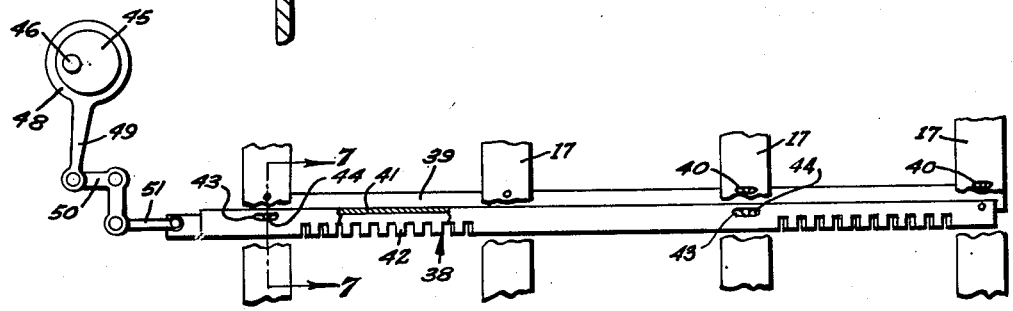

Filed May 8, 1948  5 Sheets-Sheet 5

INVENTOR
ROBERT WADE BAIRD

Patented June 16, 1953

2,641,890

UNITED STATES PATENT OFFICE 2,641,890

COTTON STRIPPER

Robert W. Baird, Inverness, Miss.

Application May 8, 1948, Serial No. 25,971

3 Claims. (Cl. 56—33)

The present invention relates to machines for mechanically stripping bolls from cotton plants while the machine is in transit across a field.

The present invention has for its object the provision of a cotton stripper which will rake through the cotton plants in a vertical direction from the base of the plant to the top while the machine moves across the field, the machine first engaging the plants near their bases and drawing in the branches as it rakes upward to ensure all of the bolls being removed.

Another object of the invention is to provide a cotton stripper which is universally flexible, so that the plant engaging leading edge of the stripping means may follow not only ground contour by vertical movement, but also lineal irregularities in the rows of cotton plants by lateral movement to permit each plant of the row to enter the throat of the stripper in an upright position so that those plants which are laterally displaced from the row will not be broken off at the ground and the bolls left on the plant.

A further object of the invention is to provide a cotton stripper in which the stripping fingers are held in their plane of movement rigidly during the stripping action to ensure positive stripping and complete removal of the bolls from the plants.

Still another object is the provision of means to remove stems, pieces of vine, etc., from the boll after it has been stripped from the plant so that the product to be sent to the gin will be cleaner and more nearly on a par with handpicked cotton.

Other objects of the invention will be apparent from the following description of one practical embodiment of the invention when taken in conjunction with the drawings which accompany and form a part of this specification.

In the drawings:

Figure 1 is a side elevation of a machine embodying the principles of the present invention;

Figure 2 is a top plan view on an enlarged scale of the forward portion of the machine shown in Figure 1;

Figure 3 is an enlarged side view of that portion of the machine shown in Figure 2, the near wheel being removed to show part of the drive mechanism;

Figure 4 is a detail view on an enlarged scale, showing in plan the lower end of one of the stripper chains, its adjustable mounting and a portion of the stripper guide track, the guard apron and the stripper fingers being removed;

Figure 5 is a section through the stripper guide and stripper chain, and is taken on the line 5—5 of Figure 6;

Figure 6 is a fragmentary top plan view on an enlarged scale of one of the beams with its stripper guide and stripper chain;

Figure 7 is a vertical section on an enlarged scale through a reciprocating cutter carried on the underside of the stripping mechanism, and is taken on the line 7—7 of Figure 8;

Figure 8 is a plan view on an enlarged scale of the cutting mechanism, the stripper guides being broken away to show the cutter beneath them; and, Figure 9 is a vertical section on an enlarged scale through the rear portion of the stripping mechanism, its drive and associated structure, and is taken on the line 9—9 of Figure 2.

Figure 10 is an enlarged side elevational view of the tilting mechanism for the frame and stripper assembly.

Figure 9:
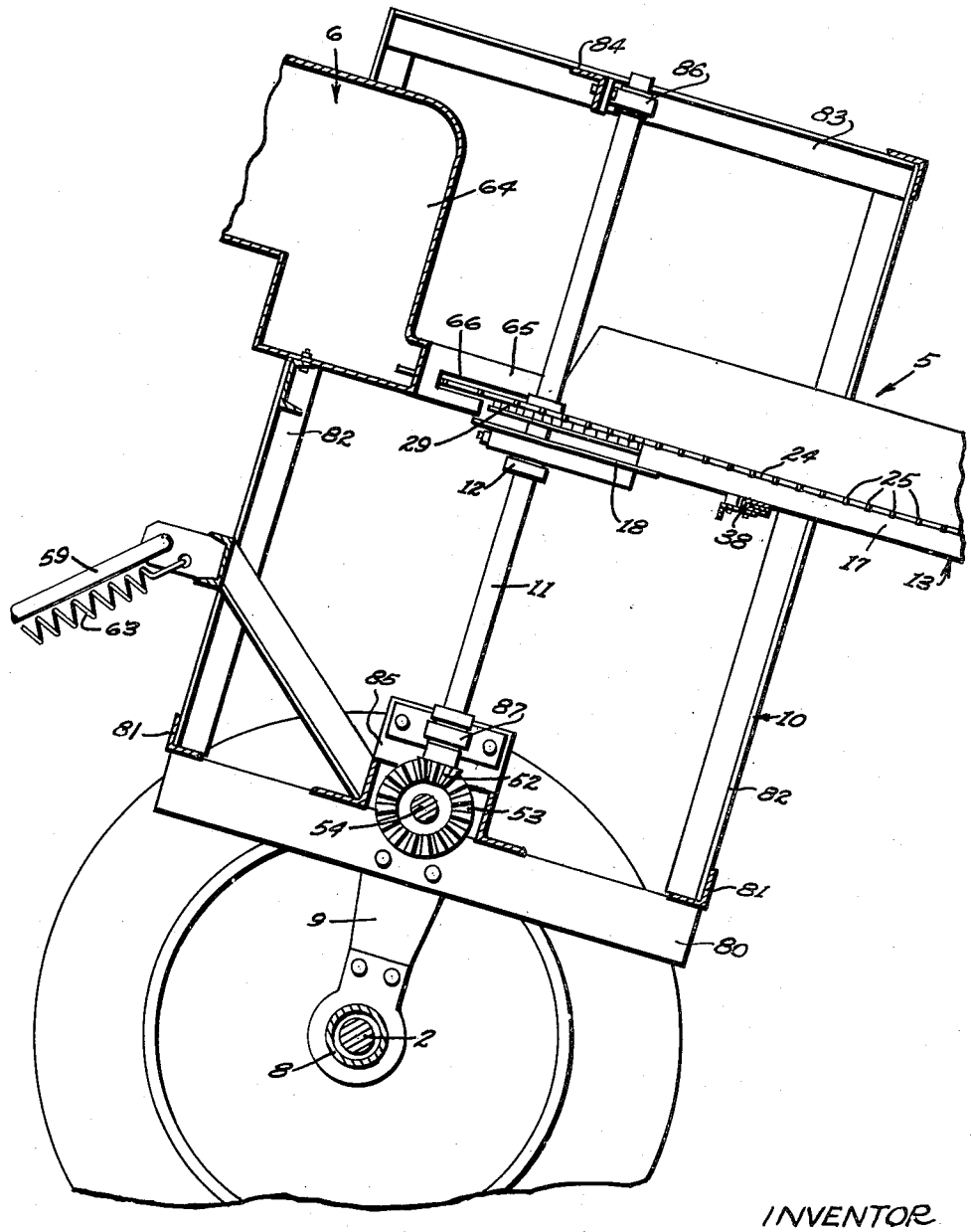

Referring to the drawings in detail, the illustrated embodiment of the invention is a self-powered vehicle which can be driven along the rows of a cotton field, stripping the bolls from the plants, and storing the cotton for subsequent dumping.

The stripper is mounted upon a chassis 1, the front axle 2 of which is driven by an internal combustion engine 3 secured to the chassis frame, power being transmitted to the axle 2 by means of a drive belt 4. Mounted upon the chassis are the stripping mechanism 5, cotton collecting apparatus 6, and a storage bin 7.

The stripping mechanism is pivotally supported upon the front axle 2 of the machine. The axle 2 is carried in a housing 8 fixed to the chassis frame, and bearing brackets 9 are turnably mounted upon the housing 8 at spaced points and are attached to a skeleton frame 10 which supports the movable parts of the stripping mechanism. The frame 10 may take any desired form. It is shown as having base members 80 to which the tops of the bearing bracket 9 are attached. These base members are bridged by connecting members 81, and vertical posts 82 in suitable number rise from the base members. The vertical posts are joined at their tops by horizontal members 83. Cross members 84 at the top and 85 at the bottom carry spaced bearings 86 and 87 respectively. There are four bearings at the top and four at bottom, and four pivot shafts 11 extend between the respective pairs of bearings 86 and 87. Each of these shafts is provided with a collar 12 about mid-way of its length. Four stripper track beams 13 are mounted upon the shafts 11, the beams resting upon the collars 12 and being journaled to the shafts so that each beam is carried by one of the shafts 11 and is transversely swingable thereon. Skeleton frame 10, shafts 11 and beams 13 are positioned at an angle so that the beams are inclined, the rear ends of the beams being at some distance above the ground and the forward ends just clearing the ground. The beams are to be employed in pairs, and each pair is joined by a bail 14 at a point about mid-way the length of the beams. Bail 14 is a rigid member which is bolted to the beams and maintains the pair of beams in parallel relation. Each end of the bail has the shank of a bolt 14' welded or otherwise secured to it with the major portion of the bolt projecting beyond the end of the bail and the bolt passes through the beam to form a pivotal connection between the bail and the beam. The bail is hung from an extension 15 of the frame 10 by means of a chain 16 and supports the major portion of the weight of the beams. The flexibility of the chain suspension provides the beams with a floating mount which permits them to move freely in a lateral direction.

Beams 13 for the greater portions of their lengths are composed of wood, as at 17. To the upper ends of the sections 17, journal plates 18 are secured, the plates resting against the undersides of the beams and projecting beyond the ends of the beams and carrying the bearings which fit upon the shafts 11. At the lower ends of the beams, skid plates 19 are attached. Skid plates 19 are also placed against the undersides of the beams and project forwardly some distance, the outer end 20 of the skids being curved upwardly so that upon striking an obstruction they will ride over it. Along the upper longitudinal edges of the portion 17 of the beam, metal wear strips 21 are placed. The wear strips are angle iron pieces which cover a portion of the side and top surfaces of the beams and extend the full length of the portion 17. Additional angle irons 22 are secured to the wear strips, the free edges of the lower flanges being welded or otherwise secured to the vertical flanges of the wear strips, and the vertical flanges of the angle irons 22 being spaced from and parallel with the vertical flanges of the wear strips.

Wear strips 21 and angle irons 22 form trackways 23 to guide the flights of stripper chains 24. Chains 24 carry a number of rather closely spaced stripper fingers 25 which project outwardly from the chains. Chains 24 may be of any conventional type with the fingers 25 secured to the links, but they are shown here as comprising conventional lower link members 26 and link pins 27, and special upper link members 28, each of which is an integral part of a stripper finger 25. Each chain passes over a pair of sprockets 29 and 30, sprocket 29 being mounted upon shaft 11, and sprocket 30 being mounted upon a shaft 31 carried by a slidable block 32 movable for tightening the chain by means of a screw and nut adjustment 33. The fact that journal plates 18 and skid plates 19 extend from the undersides of the beams permits the mounting of sprockets 29 and 30 so that chains 24 will run along the sides of the beams within the tracks 23. The lower link members 26 of the chain bear against the sides of the track and keep the chains from moving out of alignment. Upwardly and outwardly curving shields 34 are attached to beams 13 to prevent the limbs of the cotton plants from becoming entangled in the downwardly moving, or inoperative, flight of chains 24. Shields 34 have lower lateral flanges 35 which are attached to runners 36 secured to the tops of wear strips 21. Flanges 35 are, therefore, held spaced from the wear strips and serve as guides to engage the projecting inner ends 37 of upper links 28 of chains 24 to hold fingers 25 perfectly horizontal when in the operative flight of the chain, so that they cannot tilt downward under the strain of stripping the bolls from the cotton plants.

A stem cutter 38 is mounted beneath the stripper beams just below their upper ends to trim off stems and pieces of branches which may be pulled from the plant with the bolls. The stationary toothed portion 39 of the cutter extends across the machine being attached to each of the beams 13. When the machine is a two or more row stripper and more than a single pair of beams are employed, the attachment of the bar 39 to the additional pairs of beams must be by means of a pin and slot connection, as at 40, to permit each pair of beams to swing freely in a lateral direction independently of the movement of the other pair or pairs. Bar 39 is provided with a deep groove 41 in its front edge to receive a toothed reciprocating cutter bar 42. Bar 42 has slots 43 at spaced points to receive pins 44 to hold it in position within the stationary bar 39. Bar 42 is reciprocated by means of an eccentric 45 which is fixed to a shaft 46 driven from one of the shafts 11 by means of a belt drive 47. A band 48, having an arm 49, encircles the eccentric, and arm 49 is connected to one arm of a bell-crank lever 50. The other arm of lever 50 is connected to a link 51 which is connected to bar 42. Lever 59 has a pivoted mounting upon the housing frame 10.

Chains 24 and cutter bar 42 are driven by shafts 11. Each shaft 11 carries a beveled gear 52 on its lower end which meshes with a gear 53 on a horizontal shaft 54 which is positioned transversely of the frame 10. Shaft 54 also carries a sprocket gear 55 which is connected by means of a chain 56 with a sprocket 57 mounted on the driven axle 2. An idler sprocket 58 may be employed if desired. Thus whenever the axle 2 is turning and the machine is in motion the chains and the cutter bar will be in operation. The gear ratio of the drive is such that the rearward movement of the inner flights of the chains, those flights between a pair of beams 13, will be equal to the forward movement of the machine, so that the movement of the stripper fingers relative to the ground or a cotton plant will be upward only.

It has been mentioned that the frame 10 and stripping mechanism may tilt in a vertical plane about the axle 2 for purposes of adjustment or when skids 19 strike an obstruction. To hold this structure in positions of adjustment, a link 59 is connected to the frame 10, and has its opposite end coupled to an adjusting lever 60. Lever 60 has locking engagement with a quadrant 61. The connection between link 59 and lever 60 is by means of a pin and slot 62 to permit the stripper mechanism and frame to rock upward, when skids 19 strike an obstruction, without disturbing the adjustment of the lever. A heavy coil spring 63 is employed to cushion the shock of the return movement of the mechanism after it has lifted.

To remove the cotton from the stripper fingers, a vacuum system is employed. The collecting mechanism includes a manifold 64 having hoods 65 which encompass the upper ends of each pair of chains, or rather, house over the space between a pair of beams 13 so that the upwardly moving stripper fingers enter the hood while the fingers of the adjacent chains are juxtaposed, the fingers and chain beginning to turn about the sprockets 29 after passing into the mouth of the hood. Hoods 65 have narrow slots 66 in their sides to permit the fingers to swing outward and leave the hoods as they pass around the sprockets. Manifold 64 is connected to the intake of a blower fan 67 by means of a flexible coupling tube 68. The exhaust end of fan 67 is connected to a stack 69 which empties into the storage bin 7 carried on the vehicle chassis. An engine 70 is used to operate fan 67. A separate source of power is used for the fan to eliminate the necessity for excessive gearing to produce the high fan speed needed to produce the desired collection of the cotton.

In operation, the machine is driven across a cotton field with the tapering throats 71 at the forward ends of the stripper mechanism straddling the rows of cotton plants. As the machine is moved forward, the plants enter the throats 71 and the stalks come into engagement with a pair of the stripper fingers 25. The next pair of fingers turning around sprockets 30 close in behind the stalk so that the stalk is confined between the fingers. As the movement of chains 24 is timed in synchronism with the forward movement of the machine so that the chain has no horizontal movement with respect to the ground, each pair of stripper fingers in engagement with a cotton stalk will remain in engagement with that stalk during the passage of the fingers from the front to the rear of the stripper beam. The only movement of the fingers with respect to the plant is upward. As the chains move up the inclined track, the fingers will move upward on the cotton plant, drawing in and bunching its branches and at the same time raking through the branches and stripping off the bolls. As the bolls are forcibly pulled from the plant the boll will not always break free from the plant at the boll, but frequently will break at a more remote point leaving stems of various length attached to the boll. The boll moving upward supported upon the fingers will have its stem hanging downwardly through the fingers as this is the position in which the boll broke free from the plant. The down-hanging stems will be engaged by the cutter 38 and clipped off from the boll, and the gathered product will be in substantially as clean condition as hand picked cotton. After passing the cutter, the bolls will be carried into the gathering hoods 65 where they will be caught in the suction of fan 67 and drawn from the fingers and carried to the bin 7.

When the machine is properly adjusted, skids 20 will just clear the ground and the plants will be engaged just above the ground level. Vertical irregularities in the ground will cause the skids to rise, lifting the entire stripper mechanism which pivots about the axle 2. When the skid passes the bump the shock of the stripper returning to its former position will be cushioned by the spring 63. If a plant which is laterally displaced from the row is encountered the stripper mechanism for that row can swing laterally about its pivotal connections to the shafts 11 to properly engage the plant. The wide throat 71 will embrace the plant and the edge of the throat will act as a cam to move the stripper laterally to bring the stripping path in line with the plant. If it were not for this lateral movement the plant would be bent over and probably broken off at the root, whereupon the stripping fingers would carry the plant to the top of the stripping track but no stripping would be effected.

In the above there has been disclosed one practical embodiment of the invention, but it will be readily apparent that many changes may be made from the precise embodiment described and illustrated without departing from the scope of the appended claims.

What is claimed is:

1. Cotton stripper comprising, a supporting frame, a pair of inclined stripper track beams, a pivot shaft supporting one end of each stripper track beam and carried by said frame, each pivot shaft being perpendicular to the plane of the beams to permit lateral swinging movement of said beams, a rigid bail bridging said beams and pivotally connected to each of said beams at a point remote from said pivot shaft, and flexible connecting means between said rigid bail and said frame to support the free ends of said beams from said frame.

2. Cotton stripper comprising, a supporting frame mounted for vertical rocking movement, a pair of parallel inclined stripper track beams, a pivot shaft supporting one end of each stripper track beam and carried by said frame, each pivot shaft being perpendicular to the plane of the beams to permit lateral swinging movement of said beams, a rigid bail bridging said beams and pivotally connected to each of said beams at a point remote from said pivot shaft, and flexible connecting means between said rigid bail and said frame to support the free ends of said beams from said frame.

3. Cotton stripper comprising, a supporting frame, a pair of inclined parallel stripper track beams, a pivot shaft supporting one end of each stripper track beam and carried by said frame, each pivot shaft being perpendicular to the plane of the beams to permit lateral swinging movement of said beams, said beams being divergently curved at their lower ends to lead cotton plants between them, a rigid bail bridging said beams and pivotally connected to each beam at a point remote from said pivot shaft, and flexible connecting means between said rigid bail and said frame to support the free ends of said beams from said frame.

ROBERT W. BAIRD.

References Cited in the file of this patent

UNITED STATES PATENTS

| Number | Name | Date |
|---|---|---|
| 174,243 | Hill et al. | Feb. 29, 1876 |
| 745,190 | Jefferson | Nov. 24, 1903 |
| 985,036 | Houghton | Feb. 21, 1911 |
| 1,886,151 | Benjamin | Nov. 1, 1932 |
| 1,910,307 | Rust | May 23, 1933 |
| 1,928,868 | Poen | Oct. 3, 1933 |
| 1,942,192 | Stone | Jan. 2, 1934 |
| 2,170,573 | Pierson | Aug. 22, 1939 |
| 2,388,454 | Weeth et al. | Nov. 6, 1945 |
| 2,406,058 | Boone | Aug. 20, 1946 |